United States Patent

[11] 3,539,059

[72] Inventor Floyd E. Buschbom
 Long Lake, Minnesota
[21] Appl No 794,607
[22] Filed Jan. 28, 1969
[45] Patented Nov. 10, 1970
[73] Assignee Van Dale Corporation
 Long Lake, Minnesota
 a corporation of Minnesota

[54] ADJUSTABLE DISCHARGE MEANS
 21 Claims, 5 Drawing Figs.
[52] U.S. Cl. .................................................. 214/17,
 193/17, 193/25, 302/56
[51] Int. Cl. ..................................................... B65g 65/38
[50] Field of Search ........................................... 214/17 84,
 302/56; 193/17 25

[56] References Cited
UNITED STATES PATENTS
3,272,355 9/1966 Loesch et al............. 214/17
FOREIGN PATENTS
199,110 10/1965 Sweden ........... 302/56

*Primary Examiner* — Robert G. Sheridan
*Attorneys* — Donald R. Sjostrom, and Robert P. White ABSTRACT: A surface or top silo unloader of the type having a pair of augers for gathering material to the center of the silo and delivering it to an impeller which discharges the material from the silo. The discharge chute is curved in a vertical plane and has one end connected to the impeller for guiding the material discharged thereby and directing it out through an opening in the wall. A unique linkage means automatically adjusts the curvature of the discharge chute to maintain a substantially constant curvature therein as the unloader moves downwardly in the silo a substantial distance to substantially reduce the number of times that it is necessary to climb the silo and reposition the remote end of the discharge chute. An optional liner for the discharge chute is rigidly attached to the chute at the end adjacent the impeller and is resiliently connected to the chute at the remote end thereof whereby the liner will closely follow the contour of the chute without buckling, as the curvature of the chute is varied to protect the chute from wear and to provide a smooth continuous surface on the interior of the chute.

Patented Nov. 10, 1970

INVENTOR.
FLOYD E. BUSCHBOM
BY
Donald R. Sjostrom
ATTORNEY

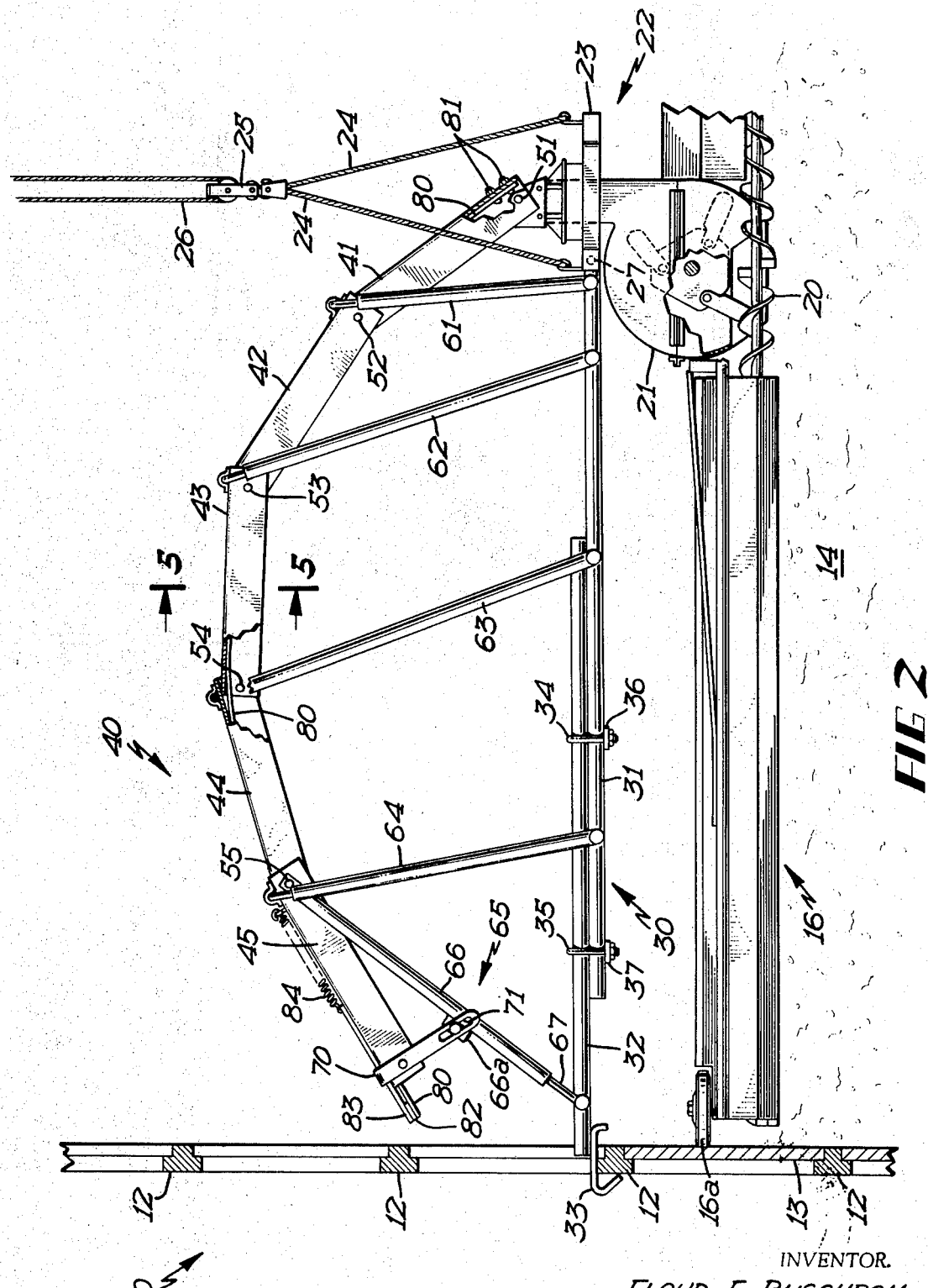

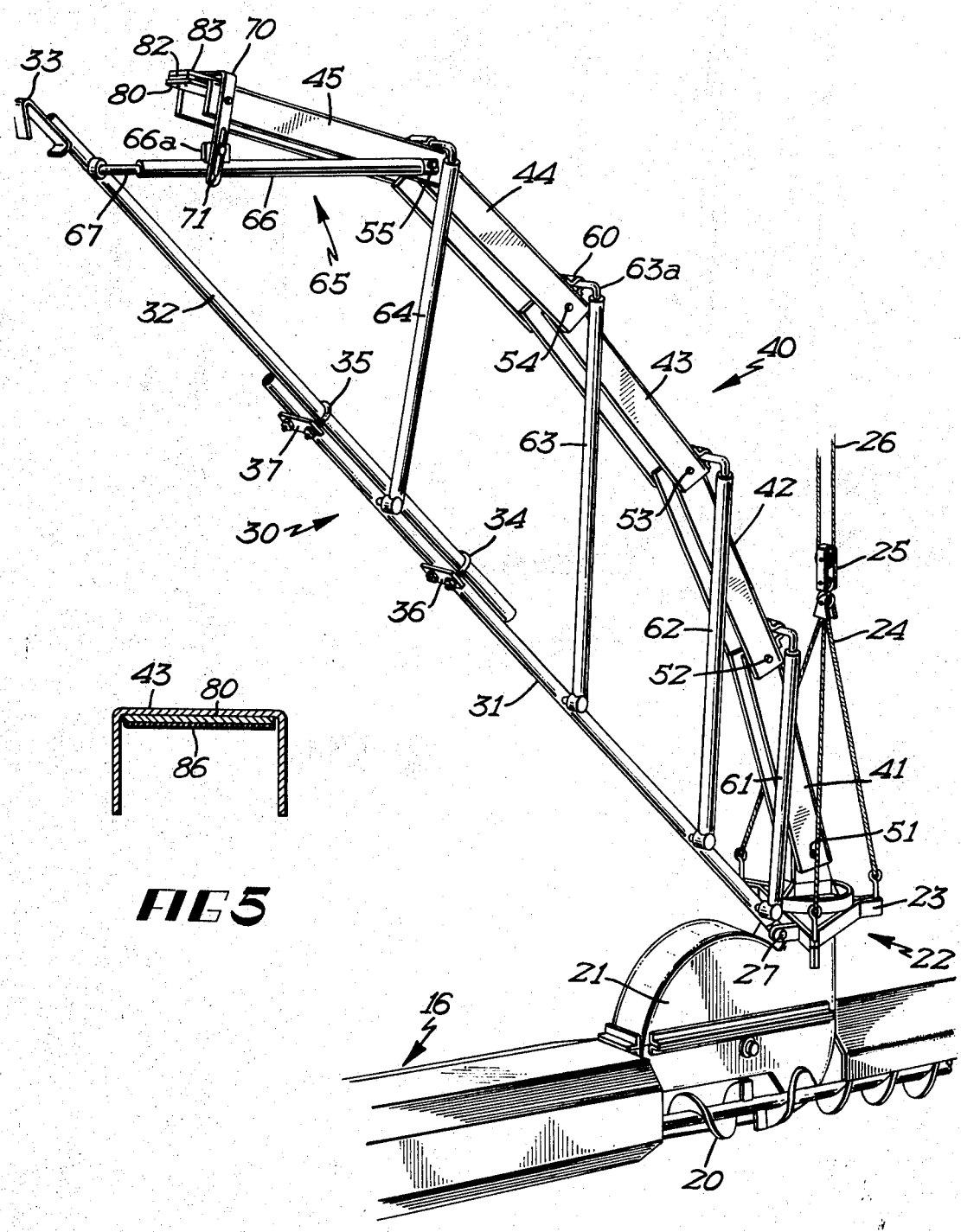

3,539,059

ADJUSTABLE DISCHARGE MEANS

BACKGROUND OF INVENTION

This invention relates to automatically adjustable discharge chute means especially for use with, and in combination with, a silo unloader of the top or surface type as described briefly above. Silo unloaders of this type are disclosed, for example, in VanDusen U.S. Pat. No. 2,719,058 and in Buschbom U.S. Pat. Nos. 2,794,560; 2,877,907 and 3,232,456. In many such unloaders the discharge chute extends to a point short of the wall of the silo and is operably connected to a torque arm which precludes the chute from rotating and also directs it toward an opening in the silo wall. The remote end of the torque arm is operably secured to the wall, generally by being removably attached to the frame surrounding the door opening in the silo. This type of construction is shown and described in detail in the Buschbom U.S. Pat. No. 2,877,907.

Although this type of silo unloader discharge chute construction has been widely used, it has had the drawback that the remote end of the torque arm has to be repositioned vertically rather frequently as the silo unloader moves downward in the silo. This involves a man climbing the ladder to the silo and physically moving the end of the torque arm downward a few feet. Naturally this involves the expenditure of time and, especially in very high silos, an element of danger since it may be necessary to do this during inclement and extremely cold weather.

Various schemes have been proposed to overcome this difficulty and to allow the silo unloader to move downward a substantial distance without requiring movement of the end of the torque arm and thereby the end of the discharge chute. Articulated and other types of flexible chutes have been proposed but it has been found that these are generally less than satisfactory because of the fact that a very substantial vertical movement of the unloader with respect to the fixed end of the chute results in uneven curvature of the chute, generally resulting in rather sharp bends therein, and this has tended to result in clogging of the chutes, particularly when very heavy and wet material is being discharged.

BRIEF SUMMARY OF INVENTION

This invention provides an improvement in silo unloaders and in discharge chutes or guide means therefore in that it provides a means for automatically adjusting the discharge chute whereby the curved chute is deformed in a controlled fashion preferably with a substantially uniform variation in curvature along substantially its full length as the silo unloader moves through a substantial vertical distance in the silo. In one form of the invention the discharge chute includes a protective liner with a unique construction whereby it closely follows the contour of the chute without buckling as the curvature of the chute is varied over a relatively wide range, and provides a smooth continuous surface on the interior of the chute.

Specifically, the discharge chute means includes a curved chute which is deformable generally in a vertical plane and which has a first end adapted for operable connection to an impeller or discharge means for movement therewith generally in a vertical direction. A longitudinally extensible, laterally rigid, arm has a first end operably connected to the first end of the chute and has means for operably connecting the second end of the arm in a predetermined position horizontally spaced from the first end of the chute (as at an opening in the wall of a silo). The second end of the chute is operably connected to the arm adjacent its second end and a plurality of linkage means operably connect the arm and chute intermediate the ends thereof and are responsive to vertical movement of the first end thereof relative to the second end thereof to controllably deform the chute along substantially its entire length. The discharge chute means finds its principal application in combination with a surface silo unloader of the type which is disposed in a silo above the material to be unloaded and which has an impeller or other means for discharging material from the silo. The chute is operably connected to the impeller at its first end for guiding material discharged by the impeller and has its remote end adapted to be operably connected to the silo as by connection to the remote end of the torque arm. A means responsive to vertical movement of the unloader (such as a torque arm having one end operably connected to the impeller and the other releasably connected to the wall of the silo) is operably connected to the chute in a plurality of positions along the chute to controllably deform the chute with a substantially uniform variation in curvature along substantially its full length.

In the preferred form the chute is an articulate member made up of a plurality of pivotally connected segments and the means responsive to vertical movement of the unloader is a longitudinally extensible, laterally rigid, torque arm pivotally connected to the impeller for movement in a vertical plane and with a first portion longitudinally fixed with respect to the impeller and a second portion adapted for connection to the silo wall and longitudinally extensible with respect to the first portion. A plurality of linkage members are spaced along the first portion of the torque arm and pivotally connected thereto and have their opposite ends connected to the chute adjacent each of the joints therein. The remote end of the chute is connected to the second portion of the torque arm. This structure provides substantially uniform variation in curvature of the chute during movement of the torque arm from a substantially horizontal position to a position wherein it makes approximately a 45° angle above the horizontal, thus corresponding to movement of the silo unloader in a vertical distance substantially equal to the radius of the silo in which it is located.

In a preferred form, the discharge chute includes an internal liner extending along at least a portion of the length of the chute and having one end rigidly secured to the chute and the other resiliently connected thereto to permit movement of said other end in a direction along the length of the chute while urging the liner into engagement with the interior of the chute. If desired, the exposed surface of the liner may include a layer or coating of a relatively noncorrosive, low friction material.

An object of the invention is to provide a surface silo unloader with an automatically adjustable chute means which will permit substantial vertical movement of the unloader within the silo without requiring manual movement and adjustment of the remote end of the discharge chute.

Another object of the invention is to provide a silo unloader with means for automatically adjusting the curvature of a deformable discharge chute to effect a substantially uniform variation in curvature along substantially the full length of the chute as the silo unloader is moved a substantial vertical distance in the silo.

Another object of the invention is to provide, in combination with a surface silo unloader which has a longitudinally extensible torque arm, a discharge chute which is curved in a vertical plane and which is deformable in said vertical plane, and means operably interconnecting the torque arm and the discharge chute in a plurality of positions to controllably deform the chute with a substantially uniform variation in curvature in response to a change in angular position of the torque arm with respect to the horizontal.

Still another object is to provide a discharge chute apparatus including a generally arcuate chute which is deformable in a vertical plane and means responsive to vertical movement of one end of the chute with respect to the other to controllably deform the chute while maintaining a substantially uniform variation in curvature thereof as said one end is moved with respect to the other.

A further object of the invention is to provide, in combination with an angularly deformable discharge chute, a liner for the chute and means for operably connecting the liner and the chute whereby the liner closely follows the contour of the chute without buckling through substantial deformation of the chute and provides a relatively smooth surface on the interior of the chute.

These and other objects of the invention will become apparent upon reading the following detailed description of the invention.

BRIEF DESCRIPTION OF DRAWING

FIG. 2 is a fragmentary and somewhat schematic side view of the unloader with the discharge chute which forms a part thereof in one of its extreme positions with respect to the unloader.

FIG. 3 is a perspective, fragmentary and somewhat schematic view taken generally from the lower left of the view of FIG. 2 and disclosing the discharge chute means in a second extreme position with respect to the silo unloader.

FIG. 5 is a cross-sectional view of a chute and a liner therein, both of which form a part of this invention, the view being taken generally along line 5-5 in FIG. 2.

DETAILED DESCRIPTION

Figure 1:
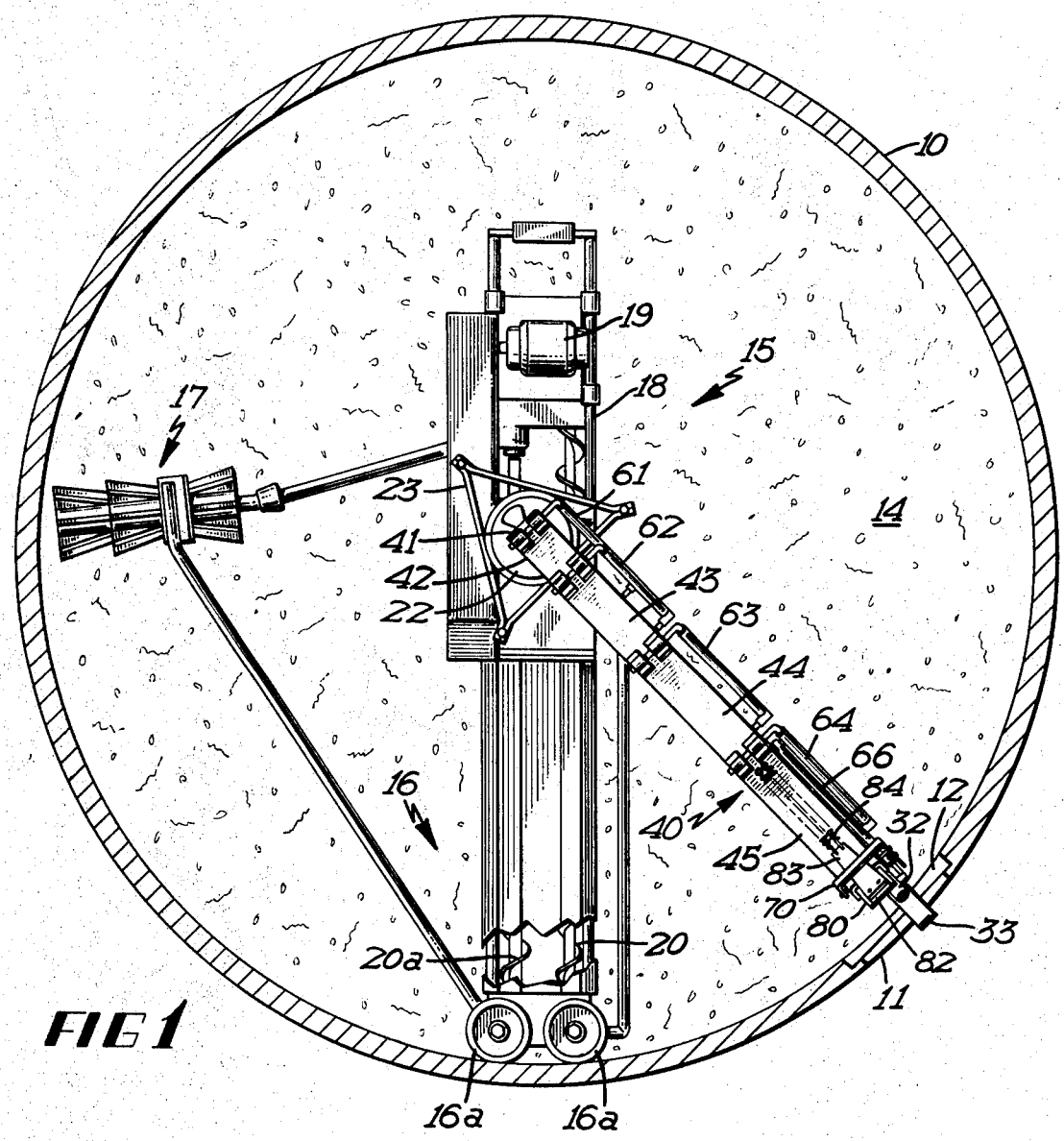
FIG. 1 is a top view of a surface silo unloader utilizing this invention and disposed within a silo.

Referring to the drawing, reference numeral 10 designates the confining wall of a conventional tower silo. Generally such silos are substantially cylindrical and include a plurality of vertically aligned door openings 11 which provide access to the silo. These door openings are separated by cross bars 12 and closed by removable doors 13 as can be seen in FIGS. 2 and 3. The silo may be used to store material such as silage, haylage or the like, this material being designated by the numeral 14 in the drawing. Disposed within the silo is a mechanical silo unloader generally referred to by the numeral 15. The silo unloader and its cooperation with the silo will be described only briefly herein except as to details essential to a description of the present invention. U.S. Pat. Nos. 2,719,058, 2,794,560, 2,877,907 and 3,232,456, by way of example, describe in detail the construction of a silo unloader of this type and its cooperation with the silo structure. Reference is made to such patents for background information.

Silo unloader 15 is of the type which is disposed above or on the surface of the silage 14 contained in the silo and is preferably suspended by appropriate means such as a tripod (not shown) which is mounted at the top of the silo. Unloader 15 includes a collector arm generally designated 16, a drive hub assembly 17, a frame 18 and a drive motor 19. Motor 19 is drivingly connected (by means not shown) to drive hub assembly 17 which drives the gathering arm and frame causing them to rotate about an axis substantially at the center of the silo. Also driven by motor 19 are a pair of counter-rotating gathering augers 20 and 20a which form a part of the gathering arm and which gather silage to the center of the silo as the unit rotates. A pair of wall wheels 16a at the end of the gathering arm engage the silo wall. At substantially the center of the silo, frame 18 carries a discharge or material moving means such as an impeller 21 which is also driven by motor 19 and which discharges or impels the silage that is gathered by the augers.

A suspension ring assembly 22 provides a rotatable supporting connection between the collector arm, frame and impeller assembly and a triangular support member 23 which is suspended by a plurality of cables 24 which are in turn connected at a common point by an appropriate clevis or the like 25 to a support cable 26 which is suspended by a pulley to the tripod previously referred to. Customarily cable 26 is connected to a winch (not shown) disposed outside and near the bottom of the silo for raising and lowering the unloader.

A torque arm 30 includes a first rigid member 31 which has one end connected to the support member 23 by a pin 27 which provides a pivot point for member 31 about a horizontal axis with respect to the impeller. The torque arm also includes a second rigid member 32 having at its remote end an appropriate hooklike member 33 for releasable attachment to the silo wall as by means of hooking it over the cross bar 12 between two of the silo doors. The outer end of member 31 and the inner end of member 32 overlie each other and are connected to provide a unit which is laterally rigid but is longitudinally extensible. This is accomplished by appropriate means such as a pair of U bolts 34 and 35 which are spaced along the torque arm, encircle both of members 31 and 32, and at their remote ends have a cross plate 36 and 37, respectively, so that they act as clamps to hold the two members together but are sufficiently loose so that member 32 may be slid longitudinally with respect to member 31.

Suspension ring 22 has an opening through its center so that material discharged by the impeller passes directly through it. Also, as is well known in the silo unloader art, the suspension ring provides a rotary electrical connection between a source of power and the motor 19 which is mounted on the frame of the silo unloader. Also connected to suspension ring 23, and aligned with the opening therethrough, is a discharge chute or guide means, generally designated by the numeral 40. As can be seen in FIGS. 2 and 3, chute 40 is generally arcuate and lies in a generally vertical plane. The chute is readily deformable in this vertical plane and, in the preferred arrangement, is an articulated member comprised of a plurality of relatively rigid segments. By way of example, chute 40 is disclosed as comprising five segments 41, 42, 43, 44 and 45. Segment 41 is pivotally connected to support ring 22 for movement in a vertical plane and each of the segments is pivotally connected to the end of the next adjacent segment. In the preferred form, each of the segments is slightly arcuate. In cross section the segments take the form of an inverted generally U-shaped trough so that the bottom of the chute is open.

As indicated, the inner end of chute segment 41 is connected to suspension ring 22 by a horizontal pivot 51. A horizontal pivot 52 connects segments 41 and 42; a horizontal pivot 53 connects segments 42 and 43; a horizontal pivot 54 connects segments 43 and 44; and a further horizontal pivot 55 connects segments 44 and 45. As will be appreciated, vertical movement of the silo unloader within the silo will result in a change in the angle between torque arm 30 and the horizontal when the remote end thereof is connected to the silo wall. Torque arm 30 is used as a means to sense the movement of the silo unloader within the silo and is operably connected to the chute by a plurality of linkage members including linkage members 61, 62, 63 and 64 which are pivotally connected to and spaced along member 31 of torque arm 30. These linkage members extend generally vertically and at their opposite ends are connected to the chute adjacent each of the pivot points. As seen in FIGS. 2 and 3, link 61 is pivotally connected to member 31 at a position just slightly spaced from pivot 27 which connects the torque arm to support frame 23. At its other end, link 61 is pivotally connected to chute segment 42 adjacent pivot 52 between segments 41 and 42. Link 62 is pivotally connected to member 31 at a position spaced outwardly from link 61 and its opposite end is pivotally connected to chute segment 43 adjacent pivot 53. Further out along torque arm member 31, is a pivotal connection with one end of link 63, the other end of which is pivotally connected to chute segment 44 adjacent pivot 54. Still further out along member 31 is a pivotal connection with one end of link 64, the other end of which is pivotally connected to chute segment 45 adjacent pivot 55. It should be noted that each of these linkage members is connected to torque arm 31 which is longitudinally fixed with respect to the impeller. Pivotally connected to the chute at or adjacent pivot 55 (between segments 44 and 45) is a generally horizontal linkage member 65 which includes a first portion 66, one end of which is pivotally connected to the chute and a second portion 67 which is longitudinal extensible with respect thereto and which at its remote end is pivotally connected to member 32 of the torque arm, adjacent the remote end thereof. In the preferred form, members 66 and 67 are telescoping members with member 67 slideable within member 66. The remote end of chute segment 45 is pivotally connected to one end of a generally vertically extending link 70 which has an elongated slot 71 at the other end. An upstanding ear or tab 66a on member 66, near its remote end, is connected to link 70 by means of a bolt which extends through a hole in tab 66a and through the slot 71 in link 70. Slot 71 provides for vertical adjustment of the remote end of segment 45.

In a preferred form, discharge chute 40 has disposed therein a protective liner 80 which lays along the bight portion of the inverted U-shaped chute. In the preferred form, liner 80 is of approximately the same length as the chute and is rigidly secured thereto as by bolts 81 which connect it to the chute (in this case to segment 41) adjacent the point at which the chute is connected to the impeller. Liner 80 is thus a long relatively narrow sheet of material and it is essential that it be relatively flexible so that it can change shape so as to conform to the contour of the chute. Liner 80 extends along the interior of chute 40 and extends slightly beyond the remote end of section 45 thereof. Secured to the end of liner 80 which extends beyond the remote end of the chute is a spacer 82 having a thickness equal to or slightly greater than the thickness of the bight portion of the chute and an oppositely extending plate or sheet member 83 which is spaced from liner 80 and extends backward therealong a short distance. As seen in the drawing, the bight portion of the remote end of segment 45 of the chute is disposed between liner 80 and the reversely extending member 83 so that the liner is held substantially against the chute at this point of connection but is movable longitudinally with respect thereto. Member 83 is provided with a pair of eyes or other means to which are connected a pair of springs 84 and 85 which are placed under tension and connected to the chute (in this case to segment 45 generally in the area of pivotal connection 55). Thus the remote end of liner 82 is resiliently urged backward in the direction along the chute so that the liner lies against the inside of the bight portion of the chute along substantially the entire length except at the joints in the chute where it is displaced slightly therefrom (see FIG. 2) to provide a smooth continuous surface on the interior of the chute. It will be appreciated that without the resilient connection at the remote end of the chute, the liner would buckle as the chute deflected so that the radius decreases or, if it were made, for example, to be of just sufficient length so as not to buckle in the position shown in FIG. 2, it would be under tension and spaced away from the bight portion when the radius of the chute increased as for example to the position shown in FIG. 3. It should also be appreciated that this unique manner of connecting the liner with the chute is extremely simple in that the connections between the chute and liner are limited to two, namely the fixed connection at the interior end of the chute and the resilient connection adjacent the remote end thereof.

Silo unloader 15 is suspended by cable 46 above the upper surface of the silage. It is lowered to a position wherein augers 20 and 20a engage the surface of the silage and drive hubs 17 are in driving engagement with the silage. Wall wheels 16a are in engagement with the interior surface of wall 10. Motor 19 powers drive hubs 16 causing the gathering arm and frame to rotate substantially about the center of the silo. At the same time augers 20 and 20a of the gathering arm gather the silage substantially to the center of the silo and supply it to impeller 21 which discharges it. Torque arm 30, because of its operable connection to the silo wall, remains stationary as does the upper portion of suspension ring 22, chute 40, and support member 23.

FIG. 2 discloses the silo unloader in a position wherein torque arm 30 is disposed substantially horizontally. In this position chute 40 is disposed in a substantially uniform arc of a relatively small radius. Torque arm 30 is collapsed so that the remote end of member 31 thereof is near the silo wall. As impeller 21 discharges the silage, chute 40 provides a guide for it to a position short of the silo wall but with the end of segment 45 disposed so that the trajectory of the silage exiting therefrom is directed through the door opening. Liner 80, lying along the interior of the bight portion of the U-shaped chute, provides a continuous smooth surface on the interior of the chute and, because of the relatively small radius of curvature of the chute, extends somewhat beyond the remote end of the chute.

As silage is discharged from the silo, the unloader gradually moves vertically downward therein. As this occurs, torque arm 30 is longitudinally extended and makes an increasingly greater angle with the horizontal. At the same time, linkage members 61 through 65 are effective to deform chute 40 so that it has an arc of increasing radius, but this deformation is in a controlled manner so that the variation in the curvature thereof is substantially uniform over substantially its entire length, at least over the first four segments 61—64. This is approximate, of course, since the segments themselves in the illustrated embodiment are rigid and do not deform. Thus, the term "uniform variation in curvature" shall include change in curvature derived from relative pivotal movement between the segments of the chute. Therefore, there are no sharp bends in the chute as have generally been experienced in the past when a relatively large vertical movement of the unloader occurs without movement of the remote end of the discharge chute. FIG. 3 discloses the apparatus with the torque arm making an angle of approximately 45° with the horizontal which is approximately the maximum deformation of the chute and torque arm possible. It will be appreciated that vertical movement of the unloader through a distance approximately equal to the radius of the silo is thus possible without moving the end of the torque arm. As the radius of curvature of the chute is thus changed, liner 80 continually remains substantially in engagement with the interior of the bight portion of the chute to provide a continuous smooth surface. As the radius of curvature increases, the position of the remote end of the liner 80 becomes closer and closer to the end of segment 45. For example in FIG. 3, spacer 82 almost engages the end of segment 45.

It will be appreciated that the linkage arrangement described herein may be used with varying sizes of equipment and with varying numbers of segments in the chute by changing the lengths of the linkage members and the position of the pivot points on torque arm member 31. By way of example, the following approximate dimensions were used in one silo unloader discharge chute assembly which embodied the present invention:

| | |
|---|---|
| Length of chute segments 41, 42, 43, 44 | 32½" |
| Length of chute segment 45 | 36" |
| Length of link 61 | 43" |
| Length of link 62 | 65" |
| Length of link 63 | 67" |
| Length of link 64 | 55" |
| Distance from pivot 27 along member 31 to: | |
| Pivot of link 61 | 3½" |
| Pivot of link 62 | 16" |
| Pivot of link 63 | 48" |
| Pivot of link 64 | 94½" |

The importance of the telescoping members of link 65 will be appreciated when FIGS. 2 and 3 are compared. It will be noted that in FIG. 2 member 65 is contracted while in FIG. 3 it is extended a substantial amount. Initially the vertical position of the remote end of chute segment 45 can be adjusted by means of loosening the bolt in slot 71. Thereafter, although the chute is deformed a substantial amount, the end of segment 45 is positioned so that the trajectory of the silage is through the door opening.

Figure 4:
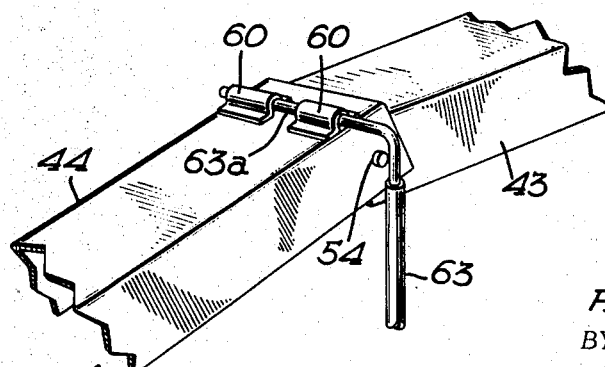
FIG. 4 is an enlarged fragmentary, perspective view of a portion of the discharge chute means disclosing the connection thereto of a linkage member which forms a part of the invention.

It will be appreciated that the specific structure of chute 40 is not essential to the invention so long as it is readily deformable in a vertical plane. Where an articulated chute is used, any number of segments may be used but preferably one of the linkage members is connected to it adjacent each of the pivot points in the chute. The type of pivotal connection between links 61—64 and the chute are not particularly critical although one preferred form is disclosed in FIG. 4. There the upper end of link 63 is disclosed as comprising a portion 63a of reduced diameter and which is bent at right angles with respect to link 63 and has been hinged by means of two bearing members 60 which are attached to the upper surface of chute segment 44 by appropriate means such as spot welding. It will also be appreciated that the specific structure of the torque arm is not critical. Obviously the two members may telescope one within the other or some other type of longitudinally extensible, laterally rigid arrangement may be used. It is critical, however, that links 61 through 64 be hinged to the portion of the torque arm which is fixed longitudinally with respect to the impeller. Furthermore, the linkage members may be constructed and arranged so that they control deformation over substantially the length of the chute to avoid sharp bends therein without actually providing uniform variation in the chute curvature. It will also be appreciated that the automatically adjustable chute may find application in equipment other then silo unloaders.

When the chute is articulated, the liner 80 becomes particularly desirable because it provides a continuous smooth surface at the joints between the various sections or segments of the chute. It will also be appreciated, however, that the liner will also substantially reduce the wear on the chute. It is well known that over long periods of usage, the chutes do eventually wear out and the liner can obviously be replaced much more inexpensively than can the entire chute. The material from which the liner is made is not critical. In one instance, it was made of galvanized material generally similar to that from which the chute was made but slightly lighter so that it would be more deformable and more readily conform to the contour of the chute. In some instances it may be desirable to place a layer or coating of material 86 on the exposed side of the liner to reduce the friction of the material passing therealong. Material 86 must be relatively noncorrosive and preferably is a low friction material such as a long chain polymer of the polytetrafluoroethylene type.

As can be seen from the foregoing, this invention provides an automatically adjustable discharge chute means which requires little or no attention on the part of the operator during movement of the movable end through a substantial vertical distance with respect to the remote end. This invention is especially useful in combination with a surface silo unloader. It greatly reduces the need for climbing the silo and repositioning the end of the torque arm. This is particularly significant with the ever increasing trend toward higher and larger silos. It also permits silo construction with substantially less door openings, reducing the cost and increasing the strength of the silo. Various modifications of this invention may be apparent to those skilled in the art in view of the disclosure herein. Therefore it is to be understood that the disclosure herein is by way of example only and that the invention is to be limited solely by the scope of the appended claims.

I claim:

1. In a silo unloader, curved guide means for receiving material and directing it generally radially of the silo, the guide means being deformable to vary the curvature thereof and having one end adapted to receive material and a remote end adapted to be aligned with an opening in the silo; means responsive to vertical movement of the unloader in the silo and a plurality of connecting members connected to said guide means in a plurality of spaced positions therealong and each separately connected to the means responsive to vertical movement of the silo unloader to controllably deform said guide means by action thereupon at said plurality of positions in response to vertical movement of the unloader.

2. In a silo unloader, curved guide means for receiving material and directing it generally radially of the silo, the guide means being deformable to vary the curvature thereof and having one end adapted to receive material and a remote end adapted to be aligned with an opening in the silo; and means including linkage means comprising a plurality of linkage members connected to the guide means and spaced in a plurality of positions therealong, the linkage members being connected to a common means which is responsive to vertical movement of the unloader to controllably deform the guide means in response to such vertical movement of the unloader.

3. The apparatus of claim 2 wherein: the guide means comprises an articulate chute means made up of a plurality of pivotally connected segments; and one of said linkage members is connected to the chute means adjacent each of the joints therein.

4. In a silo unloader, deformable discharge chute means for receiving material and directing it generally radially of the silo, the chute means being deformable to vary the curvature thereof and having one end adapted to receive material and a remote end adapted to be aligned with an opening in the silo; a torque arm having one end pivotally connected to the unloader for movement in a generally vertical plane with respect thereto and a remote end adapted to be operably connected to the silo whereby vertical movement of the unloader changes the angle of the torque arm with respect to the horizontal; and means for deforming the chute means including linkage means operably connecting the torque arm to the chute means in a plurality of points therealong to controllably deform the guide means in response to vertical movement of the unloader.

5. The apparatus of claim 4 wherein: the unloader includes gathering means adapted to be positioned on the surface of the material being discharged and to travel thereon in a generally circular path about a vertical axis, the gathering means conveying material from an outboard end to an inboard end where it is fed to a material moving means, and the gathering means moving relative to the chute means, and the chute means, the torque arm and the linkage means connecting said torque arm and said chute means are constructed and arranged so that the remote end of the chute means is maintained directed at substantially the same point and the change in curvature is substantially uniform along the chute means during vertical movement of the unloader through a distance approximately equal to the distance between the outboard end of the gathering means and the axis about which the gathering means rotates.

6. The apparatus of claim 4 wherein: an extensible means connects the remote end of the chute means to the torque arm adjacent its remote end; the means for uniformly deforming the chute means is operable in response to the variation in the angle of the torque arm to the horizontal; and the chute means, the torque arm and the linkage members operably connecting the torque arm and the chute means are constructed and arranged so that material discharged from the chute means will be directed to substantially the same point and the chute means will be substantially uniformly deformed over substantially its entire length through vertical movement of the unloader from a position wherein the torque arm is disposed substantially horizontally to a position wherein the torque arm is inclined at an angle of approximately 45° above the vertical.

7. The apparatus of claim 4 wherein: the torque arm includes a first rigid member pivotally connected to the silo unloader and a second rigid member longitudinally extensible with respect to the first member and including means at its remote end for connection to the silo; and the linkage means includes means connecting the remote end of the chute means to the second rigid member of the torque arm and further includes a plurality of generally vertically extending linkage members spaced along the chute means and operably connecting the chute means to the first rigid member of the torque arm.

8. The apparatus of claim 7 wherein: the chute means is an articulate member constructed of a plurality of pivotally connected relatively rigid segments; and said generally vertically extending linkage members include one linkage member connected to said chute means adjacent each of the pivotal connections between the segments thereof.

9. The apparatus of claim 7 wherein: said plurality of generally vertically extending linkage members each has one end pivotally connected to the first rigid portion of the torque arm and the other end pivotally connected to the chute means, said generally vertically extending linkage members being spaced along the chute means and torque arm and the most remote one of said vertically extending linkage members being connected to said chute means at a point inward from the remote end of the chute means by a distance approximately equal to the distance between the spaced generally vertically extending members along the chute means; and said linkage means further includes a generally horizontally extending linkage member including a first portion pivotally connected to the chute means at substantially the same point as the most remote one of said generally vertically extending linkage members is connected thereto, means connecting the remote end of said chute means to said first rigid portion of the generally horizontally extending linkage member, and a second portion of said horizontally extending member longitudinally extensible with respect to the first portion thereof but laterally rigid with respect to said first portion thereof, and means connecting said second portion to the second portion of said torque arm.

10. In a silo unloader, curved guide means for receiving material and directing it generally radially of the silo, the guide means being deformable to vary the curvature thereof and having one end adapted to receive material and a remote end adapted to be aligned with an opening in the silo; means responsive to vertical movement of the unloader in the silo and operably connected to the guide means in a plurality of positions therealong to controllably deform the guide means in response to vertical movement of the unloader; a liner member comprising an elongated member deformable in substantially the same plane as said guide means; means yieldably urging said liner into engagement with the interior of said guide means; and at least a substantial portion of said liner being movable relative to said guide means in a direction along said guide means.

11. The apparatus of claim 1 wherein the means responsive to vertical movement and the means operably connecting said means to said guide means are so constructed and arranged that said guide means is deformed with a substantially uniform variation in curvature along substantially its full length upon vertical movement of the unloader.

12. The apparatus of claim 10 wherein the guide means comprises a discharge chute and said chute includes a liner member comprising an elongated member constructed of relatively flexible material deformable in substantially the same plane as said chute and adapted to fit within the chute and extend therealong a substantial distance; first connecting means rigidly attaching one portion of said liner to said chute at a first position therealong; second connecting means providing a connection between said liner and said chute at a second position therealong and spaced from said first position; and means yieldably urging said liner into engagement with the interior of said chute between said first and second positions.

13. The apparatus of claim 12 wherein the last named means includes means resiliently urging the liner into an arch wherein said liner engages the interior of the chute over a substantial portion of the distance between said first and second positions and provides a generally smooth continuous surface on the interior of said chute while permitting relative movement between said chute and said liner as the curvature of said chute is varied.

14. The apparatus of claim 10 wherein the guide means comprises a discharge chute having at least three sides including two spaced leg portions and a connecting bight portion, the apparatus further including a liner member for said chute comprising an elongated member constructed of relatively flexible sheet material and having a width substantially equal to the width of the bight portion of said chute and having a length substantially equal to the length of said chute, means rigidly attaching said liner to said chute on the inside thereof and against said bight portion adjacent one end of said chute; and means providing a resilient connection between said liner and said chute at the opposite end of said liner and said chute and including means resiliently biasing said liner in a direction along said chute.

15. The apparatus of claim 14 wherein the chute is an articulate member made up of the plurality of pivotally connected segments and the last named fastening means resiliently urges the liner into an arch wherein said liner engages the interior of the chute over a substantial portion of the length of said chute while being spaced from and providing a generally smooth continuous surface on the interior adjacent each of the joints in said chute while permitting relative movement between said chute and said liner as the curvature of said chute is varied.

16. A silo unloader including a curved guide means for receiving material from a discharging means and directing it generally radially of the silo; the guide means being deformable to vary the curvature thereof and having a material receiving and a remote end adapted to be aligned with an opening in the silo; and means responsive to vertical movement of the unloader in the silo and operably and controllably connected to the guide means by a plurality of separate connecting means in a like plurality of spaced positions thereon and distributed along substantially the full length thereof to controllably deform the guide means with a substantially uniform variation in curvature along substantially the full length thereof in response to vertical movement of the unloader.

17. In combination with an apparatus including discharge means for moving material from a storage means wherein the discharge means moves vertically downward as material is removed from the storage means, an arm means extending generally radially from the discharge means and having a first end operably connected thereto by means including pivot means and a second end adapted to be operably connected to the storage means at a predetermined vertical position whereby the discharge means is vertically movable with respect to the predetermined vertical position and whereby such relative movement results in angular movement of the arm means; curved chute means having a first end operably connected to the discharge means for receiving material therefrom and a second end for directing the discharge trajectory of such material, the chute means being deformable in a generally vertical plane; and linkage means including extensible means adapted to connect the remote end of the chute means to the storage means and further including a plurality of linkage members connecting said arm means and said chute means in a plurality of positions between the ends of said chute means, said linkage means deforming the chute means by a substantially uniform change in the curvature thereof over substantially the full length thereof in response to angular movement of the arm means, to maintain the remote end of the chute means directed toward substantially the same vertical position in a wall of the storage means as the discharge means is moved downwardly.

18. The apparatus of claim 17 wherein: the curved chute means is an articulate member constructed of a plurality of pivotally connected segments; and the plurality of linkage members connecting the arm means and the chute means between the ends of the chute means are spaced along the chute means with one of said members connected to the chute means adjacent each of the pivotal connection thereof.

19. The apparatus of claim 17 wherein: the arm means includes a first rigid member pivotally connected to the discharge means and a second rigid member longitudinally extensible with respect thereto and having a remote end adapted for connection to the wall of the storage means; the extensible means adapted to connect the remote end of the chute means to the storage means includes an extensible linkage member connecting the remote end of the chute means to the second portion of said arm means; and the plurality of linkage members connecting the arm means and the chute means between the ends of the chute means include a plurality of linkage members spaced along the chute means and each having one end connected to said chute means and the other connected to the first portion of said arm means.

20. The apparatus of claim 18 wherein: the chute means includes a liner member comprising an elongated member constructed of relatively flexible material adapted to fit within the chute means and extend therealong; first connecting means rigidly attaching one portion of said liner to said chute means at a first position therealong; second connecting means providing a connection between said liner and said chute means at a second position therealong and spaced from said first position, said second connecting means maintaining said chute means and said liner in substantial engagement at said second position while rendering them relatively movable in a direction along the chute means, said first and second positions being disposed so that at least one pivotal connection between segments of said chute means is disposed between them; and means yieldably urging said liner into engagement with the interior of said chute means between said first and second positions whereby said liner is in substantial engagement with said chute means over the distance between said first and second positions but is spaced from said chute means adjacent said pivotal connection therein to provide a smooth continuous surface adjacent said connection.

21. A silo unloader of the type which is disposed in a silo above the material to be unloaded and has discharge means for discharging material from the silo; the unloader including a curved discharge chute means for receiving material from said discharge means and directing it generally radially of the silo, the chute means being deformable to vary the curvature thereof and having one end operably connected to the discharge means and a remote end adapted to be aligned with an opening in the silo; and control means including means responsive to vertical movement of the unloader in the silo and operably and controllably connected to the chute means by a plurality of separate connecting means spaced along said chute means and distributed thereon substantially the full length thereof to controllably deform the chute means in response to vertical movement of the unloader to maintain a generally smooth curvature of said chute means while maintaining the remote end thereof directed toward substantially the same position on the wall of the silo during vertical movement of said discharge means through a distance substantially equal to the radius of the silo.